(12) United States Patent
Spencer

(10) Patent No.: US 10,030,343 B1
(45) Date of Patent: Jul. 24, 2018

(54) VEHICLE ARRESTING DEVICE AND METHOD

(71) Applicant: Ethan Spencer, Melbourne, FL (US)

(72) Inventor: Ethan Spencer, Melbourne, FL (US)

( * ) Notice: Subject to any disclaimer, the term of this patent is extended or adjusted under 35 U.S.C. 154(b) by 0 days.

(21) Appl. No.: 15/804,647

(22) Filed: Nov. 6, 2017

Related U.S. Application Data

(60) Provisional application No. 62/450,109, filed on Jan. 25, 2017.

(51) Int. Cl.
    *E01F 13/12* (2006.01)
    *F42B 3/10* (2006.01)
    *F42B 3/22* (2006.01)

(52) U.S. Cl.
    CPC .............. *E01F 13/12* (2013.01); *F42B 3/10* (2013.01); *F42B 3/22* (2013.01)

(58) Field of Classification Search
    CPC ......... E01F 13/12; E01F 13/02; E01F 15/088; E01F 15/006; E01F 15/0492; E01F 15/086; E01F 15/146; E01F 15/143; E01F 15/141; F42B 3/10; F42B 3/22
    See application file for complete search history.

(56) References Cited

U.S. PATENT DOCUMENTS

| | | | |
|---|---|---|---|
| 3,974,774 A * | 8/1976 | Schaffner | F41F 3/0455 102/365 |
| 6,322,285 B1 | 11/2001 | Ben | |
| 6,409,420 B1 | 6/2002 | Horton et al. | |
| 7,736,086 B2 | 6/2010 | Coomber et al. | |
| 7,824,126 B2 | 11/2010 | Costa | |
| 7,862,251 B2 | 1/2011 | Lyddon et al. | |
| 8,202,019 B2 | 6/2012 | Lyddon et al. | |
| 8,205,537 B1 * | 6/2012 | Dupont | F41H 13/0006 102/504 |
| 8,657,526 B2 | 2/2014 | Withers et al. | |
| 8,911,172 B2 | 12/2014 | Castro et al. | |
| 9,340,935 B2 | 5/2016 | Castro et al. | |
| 9,617,696 B1 * | 4/2017 | Burns | E01D 15/124 |
| 9,702,100 B2 | 7/2017 | Castro et al. | |
| 9,714,492 B2 | 7/2017 | Castro et al. | |
| 2009/0127876 A1 | 5/2009 | Stock, Jr. | |
| 2011/0005373 A1 * | 1/2011 | Martinez | B63G 9/04 89/1.34 |
| 2011/0070022 A1 | 3/2011 | Dandy et al. | |
| 2011/0229260 A1 * | 9/2011 | Scott | E01F 13/12 404/6 |
| 2012/0243935 A1 * | 9/2012 | Spencer | E01F 13/12 404/6 |
| 2012/0251237 A1 * | 10/2012 | Dandy | E01F 13/12 404/6 |
| 2016/0281307 A1 | 9/2016 | Sullivan et al. | |
| 2017/0356726 A1 * | 12/2017 | Theiss | B64C 39/024 |

* cited by examiner

*Primary Examiner* — Abigail A Risic

(57) ABSTRACT

A vehicle arresting device and method provides a flexible net that is designed to be launched into the path of a target vehicle. The net may provide upwardly pointing spikes that are designed to embed into the tire of the target vehicle thereby causing the flexible net to wrap around the tires of the target vehicle which cause the tires to stop rotating and brings the target vehicle to a safe stop. The arresting device may be remotely controlled by the user.

18 Claims, 3 Drawing Sheets

US 10,030,343 B1

VEHICLE ARRESTING DEVICE AND METHOD

FIELD OF THE INVENTION

The present invention relates to vehicle arresting devices such as may be used by law enforcement agencies or military forces to safely stop the progress of a target vehicle, for example if stolen or suspected to be engaged in criminal or hostile activity.

BACKGROUND OF THE INVENTION

The invention is more particularly concerned with vehicle arresting devices of a kind comprising a flexible substrate intended to lie flat upon the ground when deployed in the path of a fleeing vehicle. The substrate in a device of this kind may be, for example, a panel of woven material, or it may be in the form of a net or matrix of straps or even chains. The modus operandi of a successful vehicle arrest with a device of that kind is as follows. The device is configured to launch the substrate across a surface that is in the path of a fleeing vehicle. The exact timing of the launch of the substrate is controlled by a remote or wired control that allows the operator to stand at a safe location when attempting to stop a fleeing vehicle and launch the substrate into the path of the fleeing vehicle. In an embodiment, the energy source is a pyro-technic charge that has been inserted into a pressure breech that may be ignited by a spring loaded firing pin that activates a percussion cap. When a vehicle runs over the substrate the substrate is designed to engage in the vehicle's front tires and the substrate is caused to wrap around the front wheels, the portion of the substrate between the wheels being pulled tight under the vehicle so that the tension in the substrate prevents further rotation of the wheels and the vehicle is brought to a stop. In practice this occurs in a similar distance to an emergency stop as if the vehicle's brakes had been applied, and has the advantage that it can stop the vehicle without causing serious damage to the vehicle or injury to its occupants.

It is therefore an object of the invention to provide a remotely controlled vehicle arresting device that can be quickly setup along the path of a target vehicle and a substrate may be remotely controlled to launch into the path of the target vehicle thereby causing the substrate to become entangled in the wheels of the target vehicle and bringing the vehicle to an abrupt and controlled stop.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
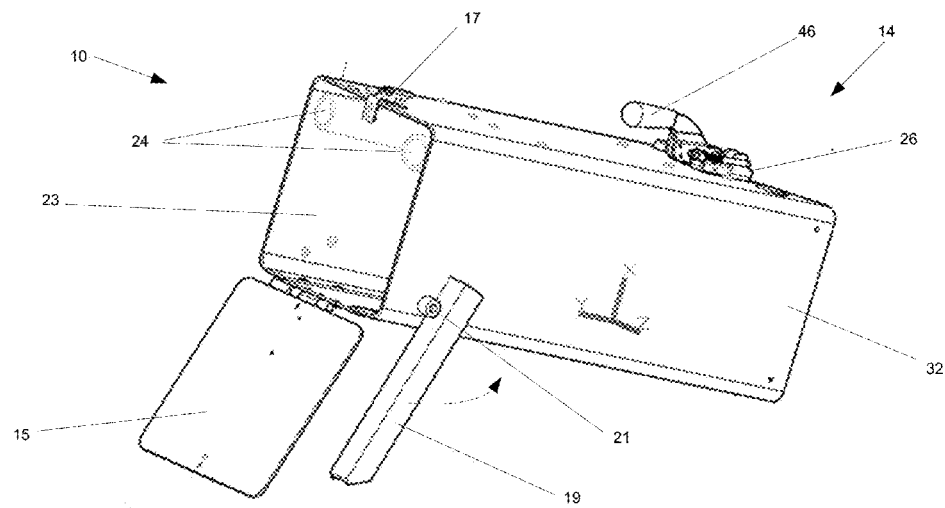
FIG. 1 is a simplified front isometric view of one embodiment of a vehicle arresting device in accordance with this disclosure.
Figure 2:
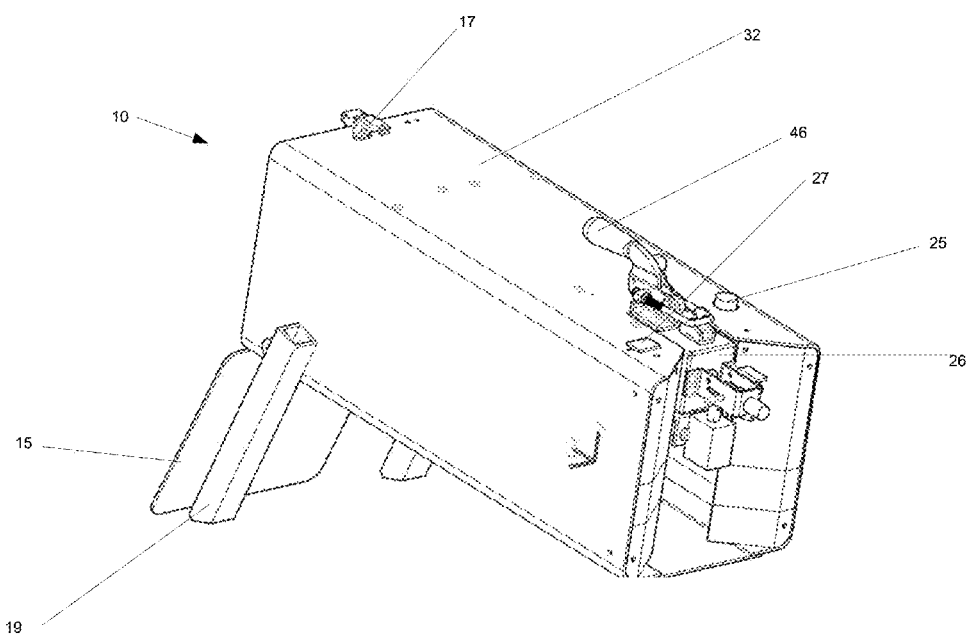
FIG. 2 is a simplified back isometric view of one embodiment of a vehicle arresting device in accordance with this disclosure.

Referring to the FIG. 1 and FIG. 2, where like numerals indicate like features, a vehicle arresting device 10 is shown which may include a launcher assembly 14 that may include a pair of outwardly facing launch tubes 24, a breech subassembly 26, and a housing 32. The launch tubes 24 are in fluid communication with the breech assembly 26 and the housing 32 may be an elongated rectangularly shaped enclosure that may be configured to house the breech assembly 26 and the launch tubes 24. A breech lock assembly 46 is disposed on the breech assembly 26. The breech lock assembly 46 is configured to lock the breech assembly 26 in a closed and locked position.

A space 23 internal to the housing 32 is configured to retain a flexible substrate 12 (SEE FIG. 5) in a folded up and compact configuration. A door 15 is rotatably affixed to a front portion of the housing 32 and the door 15 is held in a closed and latched position by a latch 17 which may be affixed to a top surface of the housing 32. A pair of legs 19 are rotatably affixed to the sides of the housing 32, the legs 19 are configured to rotate to an extended position against a rubber stop 21. The legs 19 are configured to elevate the front of the launcher assembly 14 and provide the upward angle required to launch the flexible substrate 12 into the path of a target vehicle.

A power button 25 that is configured to turn the battery power on and off to the device 10 may be disposed on a top surface of the housing 32. A voltage level indicator 27 which indicates the amount of voltage left in the onboard battery may also be provided on a top surface of the housing 32.

Figure 3:
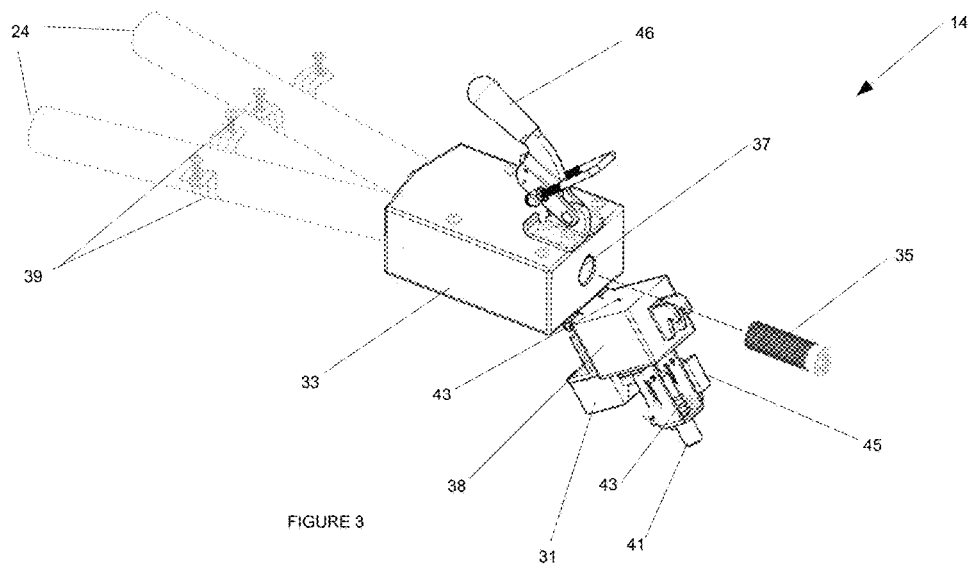
FIG. 3 is a simplified detail view of one embodiment of a launch assembly in accordance with this disclosure.
Figure 4:
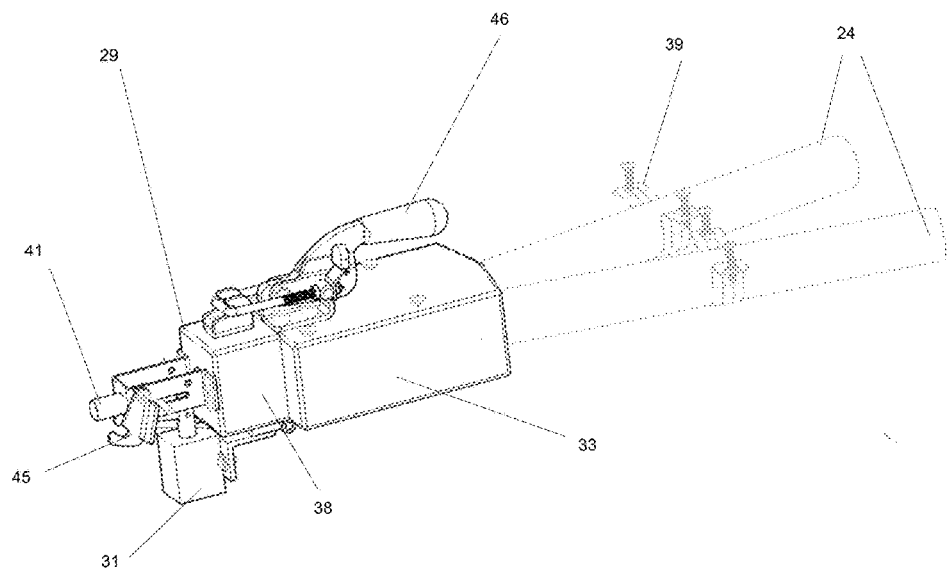
FIG. 4 is another simplified detail view of one embodiment of a launch assembly in accordance with this disclosure.

Referring now to FIGS. 3 and 4, where like numerals indicate like features, a detail view of the launcher assembly 14 is shown, with the housing 32 removed for clarity, that depicts the pair of launcher tubes 24 affixed to and extending outwardly from a breech block 33. A pair of clamps 39 are disposed along the launcher tubes 24 that are configured to connect the launcher tubes 24 to the housing 32. The breech block 33 is configured to removably accept and retain a stored energy source such as a pyrotechnic charge 35 in an orifice 37 that is disposed on a back face of the breech block 33. The breech block 33 comprises internal passageways (not shown) to facilitate the transfer of combustion gases expelled from the pyrotechnic charge 35 into the launcher tubes 24.

A breech cover 38 is rotatably mounted to the back edge of the breech block 33. The breech cover 38 comprises a spring loaded firing pin assembly 41 that is biased to a forward position by a spring 43. The firing pin assembly 41 is movable between a cocked and uncocked position. When in a cocked position, an actuator 31, such as a solenoid or the like, is configured to hold the firing pin assembly 41 in the cocked position until the user wishes to fire the device 10. When the actuator 31 is activated, it moves out of the way of the firing pin assembly 41 and the spring 43 forces the firing pin assembly 41 into a firing pin striker 43 that is disposed in the breech cover 38. The firing pin striker 43 is configured to strike the pyrotechnic charge 35 and cause the charge 35 to ignite. A safety latch 45 is disposed on the breech cover 38 which is configured to prevent the firing pin assembly 41 from being moved into a cocked position. In order to cock the firing pin assembly 41, the safety latch 45 must be rotated to an unlocked position as shown in FIG. 4. It should be noted that while a percussion firing systems is described by this disclosure, an all electronic firing system is also possible and fully contemplated by this disclosure.

Figure 5:
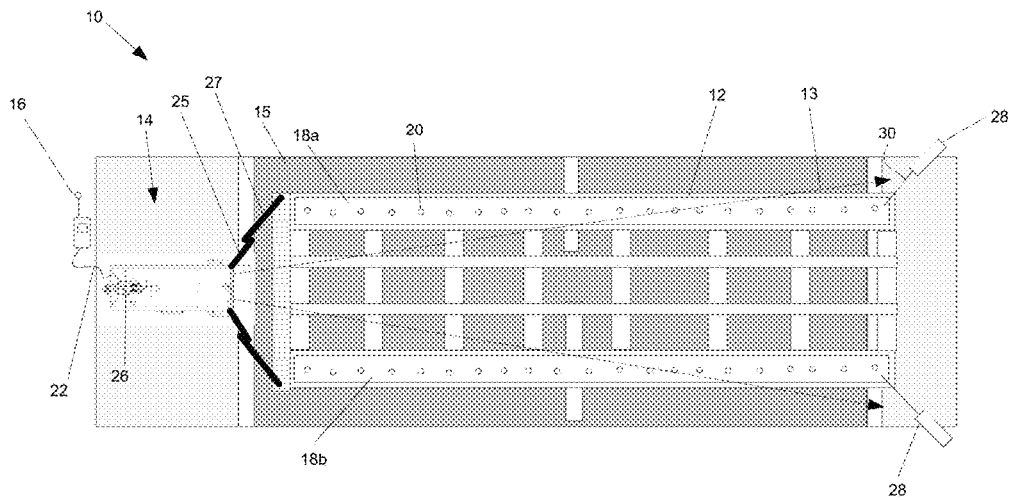
FIG. 5 is a simplified top plan view of one embodiment the vehicle arresting device placed along the path of a target vehicle in accordance with this disclosure.
Figure 6:
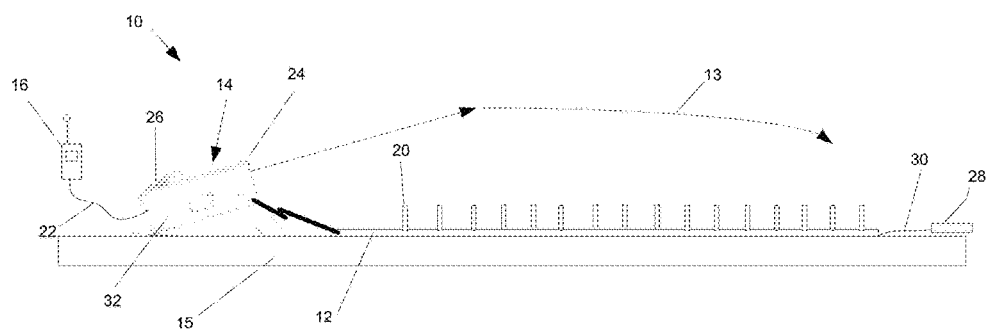
FIG. 6 is a simplified side plan view of one embodiment the vehicle arresting device placed along the path of a target vehicle in accordance with this disclosure.

Referring now to FIGS. 5 and 6, where like numerals indicate like features, the device 10 is shown placed along the shoulder of a typical roadway 15 aiming substantially perpendicularly across the road 15. A pair of weighted plugs 28 may be connected to opposite corners of the substrate 12 as shown in the drawings by a rope 30. The weighted plug 28 is sized and configured to sealing engage the inside diameter of the launch tube 24 such that it is rapidly expelled from the launch tube 24 when the pyrotechnic charge 35 is ignited. The energy imparted to the weighted plugs 28 causes them to take a trajectory substantially as shown by arrow 13 which propels the folded up substrate 12 to unfold and extend from the housing 28 into a lane of the roadway 15.

A pair of first straps 25 may be affixed to opposing front edges of the housing 28 and extend outwardly to a pair of second straps 27. The second straps 27 may be affixed to respective corners of the substrate 12 and extend to and releasably engage with the first straps 25 as shown in the figures. When connected and engaged, the first and second straps 25 and 27 act to anchor the substrate 12 to a fixed point on the housing 28 which acts to facilitate the unfolding and opening of the substrate 12 into the roadway as the substrate 12 is propelled across the road 15. The first and second straps 25 and 27 are configured to release from each other and allow the substrate 12 to become detached from the housing 28 when a target vehicle drives over the substrate 12. In one preferred embodiment, a reusable Velcro or a detachable buckle configuration may be used.

The substrate 12 may be configured to extend across at least one lane of traffic of a typical roadway 15. When the substrate 12 is deployed onto the road 15, spikes strips 18*a* and 18*b* may be configured to extend upwardly to embed into a tire of a target vehicle. Individual spikes 20 may be configured to embed into a tire and provide the retention force necessary for the substrate 12 to roll up and around the target vehicle tire.

A remote control 16 may be in electrical communication with the launcher assembly 14. The remote control 16 may be a wired remote as shown by wire 22 or a wireless remote control that is configured to initiate the launch and deployment of the substrate 12 into the path of a target vehicle by activation of the actuator 31.

As described previously, the storage housing 32 may be a hollow container that is configured to contain the substrate 12 in a compact, folded up configuration. This allows the substrate 12 to be held in a small and compact arrangement while being transported.

It should be noted that while the present description of an embodiment of the invention teaches the use of a pyrotechnic charge 35 as the energy source to launch the substrate 12, as one skilled in the art will understand, there are a range of alternative energy sources that could be used to accomplish this task. For example, any stored energy source that provides a rapid release of energy could provide the required energy, for example, large springs, pressurized air, spinning flywheel, etc., or the like. The full range of such variations are fully contemplated by the invention and the use of pyrotechnic charge is for illustrative purposes only and should not limit the scope of the invention.

Referring again to FIGS. 5 and 6, where like numerals represent like features, a user such as a police officer or security guard, could stand a safe distance away from the vehicle arresting device 10 which has been placed along the path of a target vehicle. As a target vehicle approaches the vicinity of the arresting device 10, the user presses a button on the remote control 16 to cause the pyrotechnic charge 35 to ignite and cause the weight plugs 28 to be expelled out of the launch tubes 24. The weight plugs 28 are configured to travel in a trajectory as substantially shown by arrows 13 which in turn opens the substrate 12 into the path of the target vehicle.

As the target vehicle drives over the substrate 12, one or more spikes 20 may become embedded in one or more tires of the target vehicle. As the vehicle continues to travel over the substrate 12, the substrate 12 is wrapped around the tires and first strap 25 separates from second strap 27 and the substrate 12 eventually will act to either impede or completely stop the target vehicle.

The substrate 12 may be comprised of a lattice or matrix of flexible straps or chains. In one embodiment of the invention, the substrate 12 may be comprised of vertical nylon or polypropylene rectangular straps spaced apart and affixed perpendicularly to a plurality of horizontal straps as shown in the figures. This arrangement of the substrate 12 may be advantageous over a typical rope-based net-like substrate because it takes up less volume when folded up and weighs considerable less as well. In one embodiment, the preferred strap material may be a 1-2 inch wide by 0.070 inch thick High Tenacity Polypropylene material that may exhibit a breaking strength between 1750 and 4000 pounds of force. The arrangement of the substrate 12 is configured to wrap around at least one tire of the target vehicle and prevent the tire from rotating.

In one embodiment of the device 10, testing has shown that the substrate 12 can be unfolded and extend across two lanes of traffic in approximately 1.5 seconds once the signal form the remote control is activated. This rapid deployment offers an element of surprise to the driver of the target vehicle and prevents them from taking evasive maneuvers to avoid running over the substrate 12.

What is claimed is:

1. A vehicle arresting device comprising:
    a pair of launch tubes;
    a stored energy source in fluid communication with said launch tubes;
    a pair of weighted plugs inserted into said launch tubes;
    a flexible substrate connected to said weighted plugs;
    a housing configured to contain said launch tubes and said substrate;
    a pair of retractable legs affixed to said housing, said legs configured to selectably adjust the launch angle of said launch tubes in relation to the ground, and;
    wherein said substrate is configured to launch into the path of a target vehicle when said stored energy source is released.

2. The vehicle arresting device of claim 1, wherein said substrate further comprises a substantially rectangularly-shaped matrix of nylon straps arranged in a predetermined lattice pattern.

3. The vehicle arresting device of claim 2, wherein said substrate further comprises a plurality of upwardly facing spikes configured to penetrate into the tires of the target vehicle.

4. The vehicle arresting device of claim 1 further comprising a remote control in electrical communication with the vehicle arresting device, said remote control configured to control the release of said stored energy source.

5. The vehicle arresting device of claim 4, wherein said remote control comprises a wireless remote control.

6. The vehicle arresting device of claim 1, wherein said stored energy source comprises a pyrotechnic charge.

7. The vehicle arresting device of claim 6, further comprising:
    a breech assembly configured to accept and retain said pyrotechnic charge;
    a breech cover configured to retain said pyrotechnic charge in said breech assembly;
    a lock assembly configured to keep said breech cover in a closed and locked position; and,
    a spring loaded firing pin assembly configured to strike said pyrotechnic charge and release the energy from said pyrotechnic charge.

8. A vehicle arresting device configured to be placed adjacent to the path of a fleeing vehicle comprising:
    an elongated housing;
    a plurality of launch tubes disposed in said housing, wherein said launch tubes point outwardly from one end of said housing;
    a substrate in a folded up configuration, said substrate being disposed in said housing;
    a plurality of weighted plugs each disposed in a respective launch tube, wherein said weighted plugs are attached to said substrate in a predetermined fashion;
    a pair of movable legs affixed to said housing, said legs being selectably adjustable to define a predetermined angle between said housing and the ground; and,
    a stored energy source in communication with said plurality of launch tubes, wherein the release of energy from said stored energy source causes the rapid expulsion of each said weighted plug from said launch tubes.

9. The vehicle arresting device of claim 8, further comprising a remote control configured to operatively initiate the release of energy from said stored energy source.

10. The vehicle arresting device of claim 8, wherein said weighted plugs comprises an elongated cylindrical body configured to be sealingly inserted into said launch tubes.

11. The vehicle arresting device of claim 8, wherein said substrate comprises a substantially rectangular shaped matrix.

12. The vehicle arresting device of claim 11, wherein said rectangular shaped matrix is comprised of vertical nylon straps spaced apart and affixed perpendicularly to a plurality of horizontal nylon straps wherein said matrix being configured to wrap around at least one tire of the target vehicle and prevent the tire from rotating.

13. The vehicle arresting device of claim 8, wherein said stored energy source is one selected from the group consisting of a pyrotechnic charge, pressurized air, spinning flywheel and springs.

14. The vehicle arresting device of claim 8, further comprising a plurality of upwardly pointing spikes affixed to said substrate configured to become embedded into at least one tire of the target vehicle.

15. The vehicle arresting device of claim 13, further comprising:
    a breech assembly configured to accept and retain said pyrotechnic charge;
    a breech cover configured to retain said pyrotechnic charge in said breech assembly;
    a lock assembly configured to keep said breech cover in a closed and locked position; and,
    a firing pin assembly configured to strike the firing pin of said pyrotechnic charge and release the energy from said pyrotechnic charge.

16. A method of arresting a target vehicle comprising the steps of:
    placing a launcher assembly along the path of the target vehicle;
    storing a flexible substrate inside of said launcher assembly;
    releasably attaching said flexible substrate to said launcher assembly;
    initiating the release of energy from a stored energy source;
    launching from said launcher assembly said flexible substrate into the path of the target vehicle in response to the release of energy from said stored energy source;
    affixing said flexible substrate to at least one tire of the target vehicle;
    releasing said flexible substrate from said launcher assembly so that said flexible substrate separates from said launcher assembly; and,
    arresting the target vehicle in response to said flexible substrate becoming entangled in the tire of the target vehicle.

17. The method of claim 16, wherein the step of initiating the release of energy further comprises the steps of providing a remote control in communication with said launcher assembly to operatively control the release of energy from said stored energy source.

18. The method of claim 16 further comprising the step of affixing spikes to said flexible substrate wherein the spikes are configured to become embedded in the tire of the target vehicle.

\* \* \* \* \*